Patented July 11, 1950

2,514,661

UNITED STATES PATENT OFFICE 2,514,661

CRACK-RESISTANT VULCANIZED RUBBER AND METHOD FOR ITS PRODUCTION

Frank M. McMillan, Berkeley, Calif., assignor to Shell Development Company, San Francisco, Calif., a corporation of Delaware No Drawing. Application October 4, 1948, Serial No. 52,781

11 Claims. (Cl. 260—799)

This invention relates to the compounding of rubber, and it is particularly directed to the provision of vulcanized rubber products having improved resistance against atmospheric cracking of the type believed attributable to ozone attack.

The term "rubber," as employed herein, is intended to embrace both natural rubber in its various forms, including latex, crepe, smoked and unsmoked sheet, caoutchouc, gutta percha, balata and cyclo rubbers, as well as those synthetic rubbers having a generally straight-chain structure which are derived from conjugate diolefins and can be vulcanized with sulfur to produce materials of a rubber-like nature. Included within the term are such synthetic rubbers as butadiene polymer and the polymers of the methyl substituted dienes; copolymers of one butadiene with a different butadiene compound, as the copolymer of butadiene with natural rubber; interpolymers of a butadiene compound, e. g., butadiene itself, with other polymerizable compounds such as acrylic and methacrylic acids and their esters, or with di-vinyl benzene, styrene (Buna S, Chemigum IV, Hycar O. S.) or ethylenic hydrocarbons (butyl rubber) such as ethylene, butylene, isobutylene and propylene, or with nitrogen-containing compounds such as acrylic and methacrylic acid nitriles, or with vinyls such as vinyl chloride, vinyl alcohol, vinylidene chloride, vinyl acetate, vinyl ketone and vinyl aldehyde, or with such other compounds as terpenes, paraffinic compounds, oils, resins, etc.

The above-defined materials, including both natural as well as the indicated classes of synthetic rubbers, may also properly be termed "high molecular weight polymers of conjugate diene hydrocarbons."

The various rubbers (natural and synthetic) described above are susceptible, in greater or lesser degree, to surface cracking on exposure to the atmosphere coupled with even the slightest degree of flexing. This phenomenon, variously described as "sun checking," "light checking," "weather checking," "surface cracking," "ozone cracking" and "atmospheric cracking," is believed attributable in large part to an attack on the rubber by ozone present in the atmosphere, an attack which takes place in either the presence or absence of light. This condition, which will here be generally referred to as "atmospheric cracking," should not be confused with cracking induced by repeated flexing of the rubber in the absence of ozone, nor is it related to the crazing incident to a break-up of the brittle surface layer which forms on the surface of vulcanized rubber materials exposed to light and oxygen. Both flex-cracking as well as crazing may be retarded or even prevented altogether in a known manner by the use of suitable compounding ingredients, principally anti-oxidants, but this is not the case with atmospheric cracking. The best remedy for the latter type of deterioration is to incorporate one or more waxes in the rubber mix which later bloom to the surface of the vulcanized article and cover it with a thin protective film. However, this method is impractical for use with tires and similar objects which are flexed during use, for here the protective wax film is rapidly broken up, with the result that atmospheric cracking quickly ensues and is, in fact, aggravated by the presence of the wax.

It is an object of this invention to provide a method for increasing the resistance of vulcanized rubber materials against atmospheric cracking. A more particular object is to provide a method of this nature which is not dependent on the establishment and maintenance of a film, but which acts to inhibit ozone attack and is therefore effective under both static as well as dynamic conditions. A further object is to provide a compounding ingredient for use in rubber mixtures to be vulcanized which will inhibit ozone attack on the vulcanized product without otherwise modifying the properties of the vulcanized product. Still another object of the invention is to provide vulcanized rubber compositions which will remain substantially free of atmospheric cracking under all conditions of use. The nature of these as well as the other objects of the invention will become fully apparent on a consideration of the following description.

It is our discovery that the foregoing and other objects are achieved by incorporating with the rubber, prior to its vulcanization, a minor percentage of an adduct obtained by reaction of an unsaturated organic compound with hydrogen sulfide or a mercaptan. In other respects the rubber composition is compounded in the normal fashion, after which it is vulcanized. The resulting vulcanized product manifests an increased resistance against atmospheric cracking though its other physical properties are substantially unchanged.

The unsaturated organic compounds from which the reaction products of this invention may be prepared possess at least one unsaturated linkage between two aliphatic carbon atoms regardless of the character of the compound embracing such a linkage. The unsaturated hydrocarbons such as the olefins, (which term is intended to include mono-olefins, di-olefins and polymers thereof), supply one important class of reactants, and examples of unsaturated hydrocarbons are: ethylene, propylene, 1-butene, 2-butene, isobutylene, the amylenes, 1-hexene, 2-hexene, 4-methyl-1-pentene, 4-methyl-2-pentene, 4,4-dimethyl-1-pentene, 1-octene, 1-decene, 1-cetene, styrene, cyclohexene, 3-methyl-cyclohexene, 1,4-diphenyl-2-butene, 1,3-butadiene, 1,3-pentadiene, 1,4-pentadiene, 1,4-hexadiene, 1,5-hexadiene and the homologs and analogs. When monoolefins are used, those having a relatively high molecular weight are preferred. The unsaturated hydrocarbons of the above-defined class may also have one or more of their hydrogen atoms substituted by suitable organic and/or inorganic substituents, which may include substituents such as alkoxy, alkenoxy, aryloxy, alkyloxy, aralkyloxy, alkylimido, etc.

Among the various unsaturated compounds suitable for reaction with hydrogen sulfide or a mercaptan to form the rubber additives of the present invention, a preferred class comprises the poly-unsaturated ethers and thioethers wherein each group attached to the ether oxygen atom or the thioether sulfur atom comprises an alkenyl radical containing one or more unsaturated olefinic linkages. Representative dialkenyl ethers of this preferred class are: divinyl ether, diisopropenyl ether, diallyl ether, dicrotyl ether, dimethallyl ether, di(alpha-methyl-allyl) ether, (1-butene-3-yl) (2-butene-4-yl) ether, dihexenyl ether, allyl (2-methyl-4-pentene-2-yl) ether, allyl linalyl ether, etc. The corresponding dialkenyl thioethers in which each radical attached to the sulfur atom contains an unsaturated linkage between two carbon atoms include divinyl sulfide, di(beta-chloro-vinyl) thioether, diallyl sulfide, dicrotyl sulfide, dimethyallyl sulfide, dihexenyl sulfide, and the like, and their homologs and analogs. Also included in this preferred class of ether or thioether reactants are those which contain more than one ether oxygen atom and/or thioether sulfur atom, this group of unsaturated ethers being represented by compounds of the type of 1,2-bis(vinyloxy) ethane, 1,3-bis(vinyloxy) propane, 1,2-bis(allyloxy) ethane, and the like, as well as by the unsaturated disulfides, such as divinyl disulfide.

A still more preferred group of unsaturated ethers and thioethers having the ability to react with hydrogen sulfide or mercaptans to form the rubber additives of the present invention comprises those wherein the aliphatic unsaturation occurs in both alpha and omega (i. e., terminal) positions within the molecule, representative compounds of the class being a diallyl ether, dimethallyl ether, diallyl thio ether, dimethallyl thio ether, and the like. While the foregoing compounds are all of the ether or thioether variety, it should be noted that good results have also been obtained with those aliphatic carbons such as 1,3-butadiene, 1,4-pentadiene, 1,5-hexadiene, etc., wherein unsaturation exists in the terminal positions.

As stated hereinbefore, the adducts from which the present reaction products are derived are formed by reaction of one or more of the above unsaturated organic compounds with hydrogen sulfide or a mercaptan. Any sufficiently stable aliphatic mercaptan containing one or more sulfhydril (mercapto) groups, is suitable as a reactant for the formation of such adducts. In the majority of cases it is preferable to employ the normal or isoalkyl chain mercaptans of primary, secondary or tertiary character. The methyl, ethyl, butyl, amyl, hexyl, heptyl, octyl and the like mercaptans as well as their homologs, analogs, and substitution products, may be employed with excellent results. Another group of mercaptans which may be employed as one of the two reactants comprises the dimercaptans, and particularly the polymethylene dimercaptans of the general formula $HS(CH_2)_nSH$ and its branched chain isomeric dimercaptans. This group of mercaptans may be reacted with, for example, aliphatic hydrocarbons, ethers, or thioethers containing a plurality of unsaturated linkages to produce polythioethers having high molecular weights.

The formation of the subject adducts may follow two general courses, dependent upon the conditions (especially the catalyst) employed. First, the addition may take place according to the mechanism in which the sulfur atom of the hydrogen sulfide or mercaptan attaches predominantly to the unsaturated carbon atom, or atoms, holding the greatest number of hydrogen substituents. Secondly, the mechanism may be that whereby the sulfur atom of the hydrogen sulfide or mercaptan attaches predominantly to the unsaturated carbon atom(s) holding the fewer hydrogen substituents.

The first mechanism referred to above is termed "abnormal" addition, since it follows a course contrary to that postulated by Markownikoff's rule. The "abnormal" addition is promoted by the presence of such catalysts as oxygen, ultra violet light, and/or peroxides. The peroxides preferably are organic peroxides such as the alkyl hydroperoxides, dialkyl peroxides, and alkylperoxy hydrocarbon derivatives. The alkyl hydroperoxides form a preferred group of catalysts, and of these the tertiary-alkyl hydroperoxides are the most active. They include tertiary-butyl hydroperoxide, tertiary-amyl hydroperoxide, tertiary-hexyl hydroperoxide, etc. An especially preferred class of peroxides are the dialkyl peroxides, and of these, the di-tertiary-alkyl peroxides are the most satisfactory. This group is exemplified by di-tertiary-butyl peroxide, di-tertiary-amyl peroxide, di-tert-hexyl peroxide, etc. Other peroxides which act as catalysts include alkyl peroxy alkanes, such as 2,2-bis(tertiary-butyl-peroxy)butane, as well as peroxides such as benzoyl peroxide, acetyl peroxide, benzoyl acetyl peroxide, and lauroyl peroxide, and hydroxyalkyl peroxides, such as hydroxy methyl tertiary butyl peroxide. This addition reaction occurs according to the "rule" advanced by Posner (Berichte 38, 646 [1904]).

The second mechanism referred to above is promoted by the presence of such catalysts as aluminum chloride, silicon tetrachloride, titanium tetrachloride or basic catalysts such as pyridine, piperidine, alkali metal hydroxides, alkaline earth metal hydroxides, and primary, secondary and tertiary amines.

The catalyst may be used in a wide range of concentrations, but preferably is present in amounts from about 1 mol per cent to about 10 mol per cent, based on the total mols of reactants present. Optimum results are obtained when the catalyst concentration is from about 2 to about 5 mol per cent.

The ratio of unsaturate to hydrogen sulfide or mercaptan may vary within relatively wide limits, but preferably is between 0.5 and 2 mols unsaturate to 1 mol hydrogen sulfide or mercaptan.

The temperature and pressure at which the reaction is conducted will depend to a certain extent on the concentration, activity and stability of the catalyst. If temperatures above about 150° C. are used when the catalyst concentration is as high as 10 mol per cent, the reaction may become violent, even to the point of explosion. However, if an active catalyst is present, even in amounts as low as about one mol per cent, the reaction will proceed at a satisfactory rate at room temperatures. It is preferable, from an economic and control standpoint, and when using about 2½ mol per cent of a catalyst, to maintain the temperature within the range from about 25° C. to about 150° C. As regards pressure, good results have been obtained under normal atmospheric conditions, though the reaction is speeded up somewhat, and generally improved, by use of superatmospheric pressures, as those of from 50 to 1000 p. s. i.

The time for which the adduct reaction is allowed to proceed will vary with the activity of the catalyst and the temperatures being employed. Usually the reaction will be completed, when the other conditions are as stated hereinbefore, in from about ½ to about 48 hours, and close control of the reaction is obtained when conditions are such that the reaction time is from about 1 to 10 hours.

Diluents may or may not be used, as desired. While they are not essential, their use at times may be preferable in order to reduce the viscosity of the reaction mixture, to act as a mutual solvent for the reactants and catalyst, or to reduce the concentration of the reactants, thus allowing close control of the course of the reaction. Preferably the diluent is substantially inert with respect to the reactants or catalysts. Saturated hydrocarbons are useful for this purpose. However, reactive diluents may be used for the purpose of initiating or terminating polymer chains, so as to give adducts having modified properties, as more particularly pointed out hereinafter.

In the preferred practice of the present invention the adduct disclosed above is so treated as to remove substantially all of its more volatile components before being incorporated in the rubber mix. Since the adduct reaction usually results in the formation of a mixture of products, the amount of this relatively volatile fraction will vary depending on the conditions under which the adduct is formed. Generally, the fraction volatilizing below about 100° C., and preferably below 150° C., at about 2 mm. Hg pressure, is removed in order to obtain a residue having optimum properties as regards prevention of atmospheric cracking in the vulcanized rubber articles in which the residue is incorporated.

When ethers or thioethers having unsaturated linkages in both radicals attached to the ether oxygen or thioether sulfur atom are treated with hydrogen sulfide or a mercaptan as described hereinbefore, the adducts formed are compounds having units of the general configuration:

—S—R—X—R— wherein X is either sulfur or oxygen (dependent upon whether an ether or a thioether was used) and each R is an organic radical, preferably a saturated hydrocarbon radical.

When the adduct is formed from hydrogen sulfide and an ether having unsaturated linkages in both radicals attached to the ether oxygen atom, the polymer has the general formula:

$R_1—[S—R_2—O—R_3]_m—R_4$ wherein $R_2$ and $R_3$ represent like or different substituted or unsubstituted hydrocarbon radicals, $m$ is an integer, $R_1$ represents the hydrogen atom or a radical such as —CH=$R_5$—O—$R_6$—, and $R_4$ represents the sulfhydryl radical or a radical such as —S—$R_7$—O—$R_8$=$CH_2$, wherein $R_5$ through $R_8$ represent like or different substituted or unsubstituted hydrocarbon radicals. An outstanding member of this group is the adduct of diallyl ether and hydrogen sulfide. When an unsaturated thioether is treated with hydrogen sulfide, the structure of the polymer corresponds to that above except that the oxygen atoms are all replaced by sulfur atoms, thus giving a polymer having a higher sulfur content. An outstanding member of this group is the adduct of diallyl sulfide and hydrogen sulfide.

To more clearly illustrate the preparation of adducts of the type discussed above, the following examples are given.

*Example I*

Equal molar amounts (approximately one mole each) of liquefied hydrogen sulfide and diallyl ether were introduced into a tantalum lined vessel equipped with a quartz glass light well, and the contents of the vessel were exposed, at a distance of approximately ½ inch, to the ultra violet radiations of a 200 watt Hg lamp for a period of approximately two hours at room temperatures. The pressure at the beginning of the reaction, due to the hydrogen sulfide atmosphere, was approximately 150 p. s. i., and as the reaction progressed the pressure gradually dropped, finally being about 100 p. s. i. at the completion of the reaction. The reaction product was a water-white liquid which lost approximately 25% of its weight on being distilled until a still head temperature of approximately 235° C. (2 mm. Hg) was reached. The residue was found to have a molecular weight of approximately 500 (cyro. benzene) and contained 23% by weight sulfur and from 4 to 5% by weight mercaptan (as sulfur). It had a viscosity index of approximately 140. The structural formula of this product residue appears to be as follows:

$CH_2=CH—CH_2—O—(CH_3)—$
$[S—(CH_2)_3—O—(CH_2)_3]_3—SH$

*Example II*

Equal molar quantities of hydrogen sulfide and dimethallyl ether were introduced in the liquid state into a chilled quartz bomb tube which was sealed under a high vaccum. The tube was then warmed to about 0° C., disposed in a quartz container packed with ice, and subjected to illumination from a 400 watt quartz mercury arc lamp disposed at a distance of about 6 inches from the bomb. The irradiation was continued for about eighty minutes. During this period, the volume of the solution in the bomb decreased about 15%, most of this contraction occurring during the first 20 minutes of irradiation. The reaction product was a water-white liquid which was distilled to a temperature of about 240° C. under a pressure of about 2.3 cm. (mercury) to separate the relatively lighter boiling constituents which amounted to about 17% by weight of the total. The residue fraction remaining from the aforesaid distillation was found to have the following properties:

Molecular weight (cyro-benzene) _____ 661
Sulfur, wt. percent _____ 23.1
Mercaptan, as sulfur, wt. percent _____ 7.8
Viscosity index _____ 136
Yield, wt. percent _____ 83

From the above it appears that this residual methallyl ether-hydrogen sulfide addition product has the following average structure:

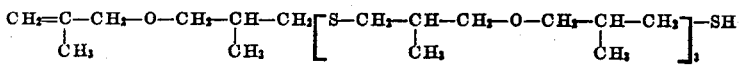

Example III

Di-(beta-mercapto ethyl) ether and diallyl ether were reacted in substantially equimolar amounts, the interaction being effected photochemically under the deliberate influence of ultraviolet radiations emanating from a quartz mercury arc lamp. The reaction was continued for about one hour during which time the volume of the reactants in the quartz vessel decreased by about 15%. The reaction product was a water-white, viscous liquid. This product was subjected to distillation to produce a residual fraction boiling above 240° C. at a pressure of 8 mm. Hg. This residual fraction had the following properties:

Molecular weight _____ 871
Pour point _____°C.____ −39
Sulfur, percent by wt. _____ 28.5
Mercaptan, as sulfur, percent by wt. _____ 6.6
Viscosity index _____ 151

From the above, it appears that this addition product has the following average structural formula:

wherein R represents —(CH₂)₃—O—(CH₂)₃—

Example IV

Equimolecular amounts of hydrogen sulfide and diallyl ether, together with 5 mol per cent di-tertiary-butyl peroxide were heated in an autoclave under a pressure of approximately 700 p. s. i. at 140° C. for approximately 5 hours. The fraction of the product boiling above 200° C. at 1 mm. mercury pressure (70% of the charge) had the following properties:

Viscosity, centistokes at 100° C. _____ 77.0
Viscosity, centistokes at 210° F. _____ 13.0
Viscosity index _____ 143

Example V

One hundred sixteen parts allyl alcohol, 35 parts hydrogen sulfide and 12.9 parts di-normal-butylamine were heated together in an autoclave at 100° C. for 48.5 hours. The product was subjected to distillation and the fraction boiling above about 134° C. at 3 mm. mercury pressure, consisting essentially of bis(beta-hydroxy-alpha-methylethyl) sulfide, was recovered. A by-product obtained in the condensation was beta-hydroxy-alpha-methylethyl mercaptan.

Having obtained the desired adduct of the type formed in the preceding examples, the same is added in either the liquid, solid, or solution form to the rubber along with the other desired compounding ingredients. The resulting mixture is then given the normal prevulcanization treatments, if any, after which it is vulcanized in the customary fashion. The amount of adduct to be employed is susceptible of considerable variation, depending both on the nature of this additive as well as on that of the rubber and the other compounding ingredients used. However, good protection against atmosphere cracking is afforded by incorporating from 0.2 to 10% of the adduct, based on the weight of rubber used, and the preferred practice is to employ from 1 to 5% thereof. While smaller amounts than 0.2% afford some measure of protection, the use of such small amounts as this is not recommended. Further, the use of amounts larger than 10% is generally undesirable since there is no commensurate improvement as regards resistance against atmospheric cracking and at the same time there is danger of so diluting the mix as to modify its other physical properties in some undesirable fashion. Within the limits here described, however, the additions of the adduct have the desired anti-cracking effect and at the same time do not otherwise modify the physical or chemical properties of the final vulcanized product. It should be noted that these additive adduct compounds are stable compositions not generally susceptible to decomposition as the rubber is aged or exposed to abnormally deleterious environmental conditions, with the result that the protection afforded by the additive is long lasting and the vulcanized article does not suffer undesirable color changes or otherwise deteriorate in quality due to breakdown of the adduct ingredient.

Subject to the limitation described above, any one or more of the hydrogen sulfide or mercaptan —unsaturate adducts described herein may be incorporated to advantage with any organic, rubber-like substance capable of being vulcanized with sulfur. As was pointed out above, this class of rubber-like compounds includes not only the various natural rubbers, though they constitute the preferred class of compounds with which to employ the herein described additives, but also the various synthetic rubbers having conjugated olefinic linkages in the molecule, i. e., the conjugated diene structure. Combinations of both natural and synthetic rubbers may also be used.

The new vulcanizable combinations of this invention comprise mixtures, preferably intimate homogenous mixtures, of one or more of the above-identified adducts together with one or more rubbers of the type vulcanizable with sulfur. The mixture may be produced by any known method, including blending on a roll mill, in a scale mixer, in a Banbury mixer, by precipitation from a common solvent, or by dispersion in water and addition to rubber latex, followed, if desired, by coagulation.

In addition to the hydrogen sulfide or mercaptan-unsaturate adduct and rubber, the vulcanizable compound normally contains other additives of which one is necessarily a vulcanizing agent. Suitable agents of the character are sulfur, sulfur chloride, sulfur thiocyanate, thiuram polysulfides and other organic or inorganic polysulfides, organic and inorganic peroxides, halogen-containing compounds and nitrogen-containing compounds, such as the nitrobenzenes.

Vulcanization accelerators and accelerator-activators may be present, particularly when sulfur-containing compounds are ingredients of the compositions. Illustrative examples of accelerators are tetramethyl thiuram disulfide, zinc dibutyl dithiocarbamate, tetramethyl thiuram monosulfide, dipentamethylene-thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiocarbamate, di-o-tolylguanidine and lead dimethyldithiocarbamate. The metal oxides such as zinc oxide and lead oxides are frequently added as accelerator-activators.

Tackifying and plasticizing substances are also common adjuvants, suitable compounds of this nature being dibutyl phthalate, dioctyl phthalate, tricresyl phosphate, triacetin, tetralin, soft coal tar, "Cumar" resins, soft factice, wool grease, petroleum oils, pine tar, asphalt, stearic acid, lauric acid and waxes. Polyallyl esters of monobasic acids may also be employed.

One or more antioxidants may be present, one of the most common being phenyl beta-naphthylamine. Illustrative of other antioxidants are p-hydroxy diphenyl, hydroquinone, p - aminophenol, p,p'-diaminodiphenylmethane, poly alkyl phenols, m-toluylenediamine, diphenylamine, o-ditolylamine, p - ditolylamine, phenyl - alpha-naphthylamine. phenylbeta - naphthyl-p-nitroso amine, symmetrical di-beta-naphthyl-p-phenylene diamine, diphenyl-diamino-ethane and 2,4-diamino-diphenylamine.

In many of the compositions it is also desirable to add carbon black, the latter material acting not only as a filter and stiffener, but also as an agent to increase the tensile strength and to impart a black color to the product. The choice of carbon black type will depend upon many factors, principally the nature of the rubber and the purpose of the composition. Soft and hard channel black, thermal decomposition black and semi-reinforcing furnace black are common types. The properties of the compositions, including color, may also be modified with other pigments such as titanium dioxide.

Having compounded the rubber by mixing therewith the above-described adduct, a vulcanizing agent, and other compounding ingredients of the type named above or otherwise employed in the art, the mix is vulcanized by treatment at elevated temperatures, preferably above 100° C., for periods varying from several minutes to one or more hours. Preferred vulcanizing treatments are those conducted at temperatures of from 125 to 175° C. for from 15 to 45 minutes. Aside from this, the upper limit of the vulcanizing temperature is ordinarily determined only by reason of the degradation or decomposition of the material, or by the volatility of one or more of its constituents.

Compositions can be produced in accordance with the invention which are capable of use for substantially all of the purposes for which other rubber-like compositions are employed. Examples which come readily to mind are automobile tires and tubes, floor tilings, balloon coverings, umbrellas, raincoats, table covers, shower curtains, garment bags, electrical insulation, friction tape, hose for the handling of aqueous substances and of petroleum products and paints, lining and exterior coating in self-sealing gasoline tanks, gaskets, belts, shoe soles, and heels, aprons, gloves, sporting goods such as rubber balls, bathing suits and caps, and drug sundries.

The following examples illustrate the present invention in various of its embodiments.

*Example VI*

In this operation, sheets of vulcanized rubber were prepared by blending on a roll mill 100 parts of natural rubber (pale crepe), 5 parts zinc oxide, 10 parts titanium dioxide, 1 part stearic acid, 2 parts sulfur and 1 part benzol thiazyl disulfide, together with 2 parts of the adduct whose preparation was described above in Example I, the latter being omitted in the case of a "control" sheet. Samples of each of the resulting sheets were then vulcanized at 140° C. for periods averaging about 30 minutes. The vulcanized products were exposed to the atmosphere on the roof at Emeryville, California for 60 days during the months of January, February and March, the exposure being conducted in accordance with A. S. T. M. method D–518–38T, in which a one inch by five inch looped strip of each sample was exposed at a 45 degree angle to the weather.

In the "control" group of rubber strips all showed substantially the same results, with the surface being badly cracked at the end of 11 days and disintegrating at the end of the 60-day test. With the strips incorporating the diallyl ether-hydrogen sulfide adduct, however, a few fine cracks developed by the 25th day, and this was still the condition at the end of the 46th day. This is regarded as excellent protection against atmospheric cracking. There was still no evidence of deterioration even at the end of the 60-day test period.

*Example VII*

In this operation, vulcanized rubber belts $\tfrac{1}{16}$ inch thick, $\tfrac{3}{8}$ inch wide and 3 inches in diameter were prepared using the same formula and method of compounding as described in Example VI above. In order to test the resistance of these belts to atmospheric cracking under dynamic conditions, they were placed over a $2\tfrac{7}{8}$ inch revolving drum and a 1 inch drive shaft under slight tension. The mechanism was exposed to the atmosphere on the roof at Emeryville, California for a period of 21 days in the month of August, during which time the shafts were driven constantly. In the case of the "control" belt containing no additive, a great many fine cracks developed very early, i. e., the 4th day. A belt incorporating 2 parts by weight of the diallyl ether-hydrogen sulfide adduct of Example I was still uncracked at the end of the 21 day test period.

The claimed invention is:

1. The method of improving the resistance of vulcanized rubber against atmospheric cracking which comprises mixing with a vulcanizable rubber composition an adduct formed by catalytically reacting diallyl ether with hydrogen sulfide, and thereafter vulcanizing the mixture, said adduct being topped to remove its more volatile constituents and being present in the amount of from about 0.02 to 10% by weight in terms of the weight of rubber present.

2. The method of claim 1 wherein the adduct is present in the amount of 2% and boils above about 235° C. (2 mm. Hg).

3. The method of improving the resistance of vulcanized rubber against atmospheric cracking which comprises mixing with a vulcanizable rubber composition an adduct formed by catalytically reacting dimethallyl ether with hydrogen sulfide, and thereafter vulcanizing the mixture, said adduct being topped to remove its more volatile constituents and being present in the amount of from about 0.02 to 10% by weight in terms of the weight of rubber present.

4. The method of improving the resistance of vulcanized rubber against atmospheric cracking which comprises mixing with a vulcanizable rubber composition an adduct formed by catalytically reacting diallyl thioether with hydrogen sulfide, and thereafter vulcanizing the mixture, said adduct being topped to remove its more volatile constituents and being present in the amount of from about 0.02 to 10% by weight in terms of the weight of rubber present.

5. The method of improving the resistance of vulcanized rubber against atmospheric cracking which comprises mixing with a vulcanizable rubber composition an adduct formed by reacting a dialkenyl ether with a compound selected from the group consisting of hydrogen sulfide and aliphatic mercaptans, and thereafter vulcanizing the mixture, said adduct being topped to remove its lower boiling constituents and being present in the amount of from about 0.02 to 10% by weight in terms of the weight of rubber present.

6. The method of improving the resistance of vulcanized rubber against atmospheric cracking which comprises mixing with a vulcanizable rubber composition an adduct formed by reacting a dialkenyl thioether with a compound selected from the group consisting of hydrogen sulfide and mercaptans, and thereafter vulcanizing the mixture, said adduct being topped to remove its lower boiling constituents and being present in the amount of from about 0.02 to 10% by weight in terms of the weight of rubber present.

7. A vulcanized rubber composition containing 2% by weight, in terms of the weight of rubber present, of an adduct formed by reacting diallyl ether with hydrogen sulfide in the presence of a catalyst and thereafter topping the adduct to remove its more volatile constituents.

8. A vulcanized rubber composition containing from about 0.02 to about 10% by weight, in terms of the weight of rubber present, of an adduct formed by reacting diallyl ether with hydrogen sulfide in the presence of a catalyst and thereafter topping the adduct to remove its more volatile constituents.

9. A vulcanized rubber composition containing from about 0.02 to about 10% by weight, in terms of the weight of rubber present, of an adduct formed by reacting dimethallyl ether with hydrogen sulfide in the presence of a catalyst and thereafter topping the adduct to remove its more volatile constituents.

10. A vulcanized rubber composition containing from about 0.2 to 10% by weight, in terms of the weight of rubber present, of an adduct formed by reacting a dialkenyl ether with a compound selected from the group consisting of hydrogen sulfide and aliphatic mercaptans, said adduct being topped to remove its more volatile constituents.

11. A vulcanized rubber composition containing from about 0.2 to 10% by weight, in terms of the weight of rubber present, of an adduct formed by reacting a dialkenyl thioether with a compound selected from the group consisting of hydrogen sulfide and mercaptans, said adduct being topped to remove its more volatile constituents.

FRANK M. McMILLAN.

REFERENCES CITED

The following references are of record in the file of this patent:

UNITED STATES PATENTS

| Number | Name | Date |
|---|---|---|
| 1,839,950 | Cadwell | Jan. 5, 1932 |
| 2,313,945 | Kellog et al. | Mar. 16, 1943 |
| 2,398,479 | Vaughan et al. | Apr. 16, 1946 |
| 2,402,586 | Alvarado | June 25, 1946 |